United States Patent [19]
Hein et al.

[11] Patent Number: 6,126,153
[45] Date of Patent: Oct. 3, 2000

[54] METHODS OF FORMATION AND INSTALLATION OF PREPACKAGED FLUID-DAMPING ARTICLE FOR ELASTOMERIC MOUNT

[75] Inventors: Richard D. Hein, Wabash; Walter J. Kelly, Marion, both of Ind.

[73] Assignee: BTR Antivibration Systems, Inc., Fort Wayne, Ind.

[21] Appl. No.: 08/329,398

[22] Filed: Oct. 26, 1994

Related U.S. Application Data

[62] Division of application No. 08/158,713, Nov. 24, 1993, Pat. No. 5,848,782, which is a continuation of application No. 07/874,930, Apr. 28, 1992, abandoned.

[51] Int. Cl.[7] .................................................. B60K 5/12
[52] U.S. Cl. ........................................................ 267/140.13
[58] Field of Search ........................ 267/140.11, 140.13, 267/140.14, 122; 29/76.5, 897.2, 407, 801; 220/403; 248/562, 636

[56] References Cited

U.S. PATENT DOCUMENTS

| | | | |
|---|---|---|---|
| 1,288,447 | 12/1918 | Seibel | 267/140.11 |
| 3,612,506 | 10/1971 | Malherbe | 267/152 |
| 4,424,961 | 1/1984 | Takei | 267/140.13 |
| 4,560,150 | 12/1985 | Shtarkman | 267/140.13 |
| 4,650,169 | 3/1987 | Eberhard et al. | 267/140.14 |
| 4,981,286 | 1/1991 | Kato et al. | 267/140.14 |
| 5,193,788 | 3/1993 | Richter et al. | 267/140.13 |
| 5,205,545 | 4/1993 | Quast | 267/140.13 |

FOREIGN PATENT DOCUMENTS 63-35838   8/1983   Japan .

*Primary Examiner*—Matthew C. Graham
*Attorney, Agent, or Firm*—Wood, Herron & Evans, L.L.P.

[57] ABSTRACT

An elastomeric mount for automotive application is provided having a preassembled, sealed fluid composite with a first and a second fluid chamber connected by means of a restricted orifice. The fluid package is accepted into and supported by an upper and a lower compliance member which provide general damping of vibration and oscillation of an automotive component. Means are provided to regulate the flow of the fluid and/or the fluid flow characteristics between the first and the second chamber in response to a stimulus to selectively isolate and dampen undesired vibration.

5 Claims, 3 Drawing Sheets

6,126,153

METHODS OF FORMATION AND INSTALLATION OF PREPACKAGED FLUID-DAMPING ARTICLE FOR ELASTOMERIC MOUNT

This application is a division of application Ser. No. 08/158,713, filed Nov. 24, 1993, now U.S. Pat. No. 5,898,787, which, in turn, was a continuation of application Ser. No. 07/874,930 filed on Apr. 28, 1992 (abandoned).

FIELD OF THE INVENTION

The invention relates to a method of component assembly, sealing, filling and testing of the fluid composite member prior to and remote from final implanting into the elastomeric mounts, and in particular, to elastomeric mounts for automotive applications. More particularly, the invention relates to such elastomeric mounts for automotive applications such as resiliently supporting and isolating an automotive power train and/or suspension, the mount having auxiliary damping properties achieved through use of a fluid.

BACKGROUND

Known prior art fluid-damped elastomeric mounts generally are of three types. A first type is a basic bushing having opposed fluid reservoirs which communicate through inertial track capillaries, and is normally used in automotive suspension components requiring a single axis damping. A second type of fluid-damped elastomeric mount is a modified bushing incorporating a "dash pot" type viscous damping that forces fluid past a baffle when axial movement occurs, and is typically used in automotive shock/strut components. A third type is a basic fluid-damped mount having dual fluid chambers communicating through an inertial track and decoupler system together with a fluid return mechanism.

However, all of the above-described known prior art fluid-damped elastomeric mounts typically have a number of inherent problems which make them labor and/or equipment and cost intensive to varying degrees. First, the design of the elastomeric mounts is relatively complicated to provide for anticipated forces and displacements, and also must provide for a permanent hydraulic pressure seal to maintain the fluid in place in the part. Second, introduction of the fluid into the fluid cavity and accessory parts such as the inertial track and/or decoupler system is difficult, with two methods generally being currently employed. In one method, the components of the elastomeric mount can be assembled and sealed while submerged in a fluid bath, or in another method, after assembly and sealing of the elastomeric mounting components, the fluid cavity can be evacuated and filled with the selected fluid. After assembly, filling and sealing of the elastomeric mount, the mount must be carefully checked for leaks and dynamic characteristics. As set forth above, such methods of forming the elastomeric mounts can be labor and/or equipment and cost intensive.

Moreover, such methods of fluid filling and pressure sealing the elastomeric mounts can be damaging in applications where electro-rheological fluid damping is called for. Such fluids change density in response to the application of an electrical charge and thereby change the damping characteristics of a mount. Such systems require precise placement of wires, contacts, connectors, sensors, etc., which are sensitive to damage, displacement, or contamination. Therefore, the two, above-described methods heretofore used for assembling, filling and sealing fluid-damped elastomeric mounts can pose problems. Specifically, assembling and sealing elastomeric mounting components while submerged in a fluid bath or alternatively assembling and sealing the elastomeric mount and separately filling the mount, subjects sensitive electrical components to hostile environments and contaminants such as liquid, heat, and heavy presses and further presents difficulties in the context of an assembly line environment.

The closest known prior art to the present invention is set forth immediately below.

U.S. Pat. No. 4,593,891 relates to a vibration-absorbing engine mounting device with fluid damping which comprises an upper mounting member, a lower mounting member, a rubber wall body interposed between both the mounting members with its upper and lower portions being air-tightly sealed to the upper and lower mounting members respectively, a block damper transversely provided in the rubber wall body, and a capsule encased in a space enclosed by the former four members, thus defining a closed chamber enclosed by the former five members. The capsule comprises an exterior rigid case, an interior sealed bag encapsulated in the rigid case, defining a sacciform chamber and an orifice member entering the former two. The closed chamber and the sacciform chamber are filled with fluid, whereby they are put in communication with one another by the passage of fluid via the orifice member.

U.S. Pat. No. 4,613,118 relates to a fluid-sealed engine mounting comprising a connector for being connected to an engine, a base for being mounted on a vehicle frame, and an elastic member joining the connector to the base, the connector, the base, and the elastic member jointly defining a fluid chamber in which a fluid is sealed during assembly of the mount. The fluid-sealed engine mounting has a variable-volume member mounted on one of the connector and the base in the fluid chamber and containing at least a gas capable of negative atmospheric or positive pressure sealed therein, the first variable-volume member being expandable and contractible in a direction in which vibrations are transmitted in the fluid chamber.

DETAILED DESCRIPTION OF THE INVENTION

Figure 1:
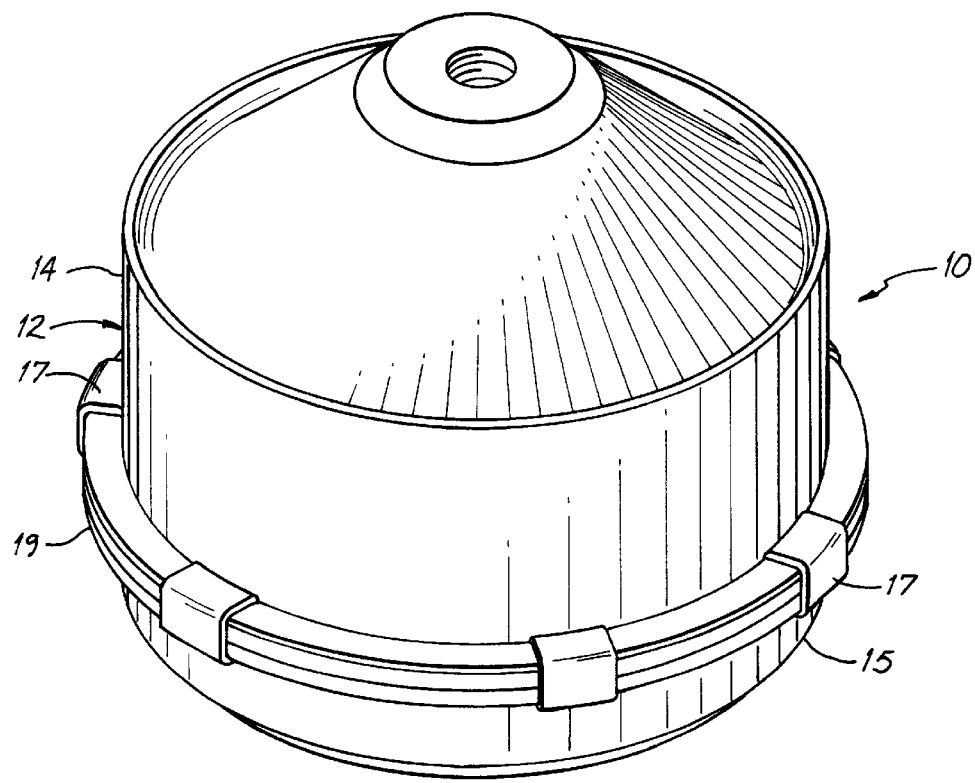
FIG. 1 is an example of the elastomeric mount in accordance with the invention.
Figure 2:
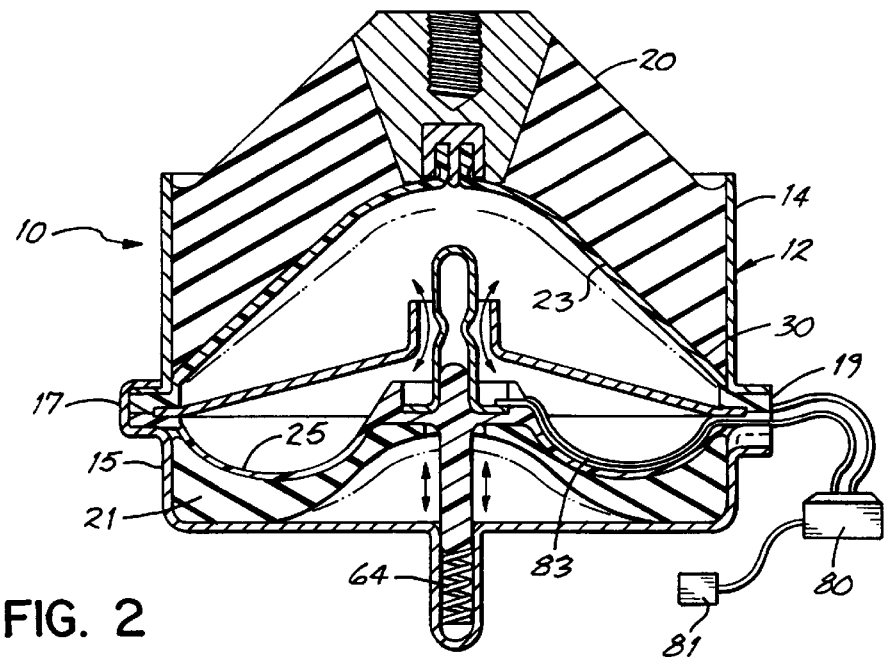
FIG. 2 is a side cross-section of a first embodiment of the elastomeric mount.

An elastomeric mount in accordance with the invention is shown generally at 10 and comprises a housing or canister 12 which has an upper cylindrical member 14 and a lower cup member 15 which are joined together by means of clips 17 which form mechanical joints at flange 19, which does not require hydraulic seal capability. Further, the mount includes an upper compliance member 20 and a lower compliance member 21 having opposing internal surfaces 23 and 25, respectively. Both of the compliance members 20 and 21 are hollowed so that the surfaces 23 and 25 respectively form a inner chamber to receive and support a fluid composite member 30.

The upper compliance member 20 meets multi-axis static and dynamic requirements and has a size and geometry to meet the requirements of the particular vehicle with which it is used. Further, the compliance members includes an insert 27, which has a threaded bore 29 on the external side for mounting the component to be supported which could be a threaded stud or the like. The insert further has a recess 28 which receives the fill cap 32 of the fluid package member 30. This fill cap could also be located at the equator of the fluid composite or another convenient place. The insert 27 is made of a suitably stiff material, such as metal.

The fluid composite member 30 is a self-contained fluid tight sealed member which comprises a top diaphragm member 34 including a sealing flange 35 and seal port 36 which is sealed by means of fill cap 32 or other alternative means. There is further included a bottom diaphragm 38 having a bottom sealing flange 39.

The fluid composite member 30 further includes a divider plate 40 having a central orifice 42 and having an inlet and outlet port defined by longitudinally extending walls 43 which together with a stop cock member 52 form a channel 42.

The top diaphragm member is shaped so as to form a top fluid chamber, while the bottom diaphragm member 38, includes a depression 47 with a recess 49, in the central raised portion and a nipple 50 which extends into said fluid chamber.

The nipple 50 receives a stop cock member 52 having flanges 53 which are received in the recess 49. The stop cock 52 has a pinched section of reduced diameter 55 which regulates the flow of the fluid through the orifice 42 of the divider plate 40. The stop cock extends through the orifice into the upper fluid chamber.

The lower compliance member further includes an elongated boss 60 which projects longitudinally downward through a opening in the lower compliance member 21. The boss engages a compression spring 64 which rests in a recess 65 in the lower housing member 15. This provides additional fluid return force if it should be required.

The circumferential flange 19 is comprised of the supporting flanges 66, 67 of the top and bottom housing members respectively and of the sealing flange portion 35 and 39 of the top and lower diaphragms respectively. The divider plate 40 also includes an extending perimeter 70 which is captured between the flange 35 of the top diaphragm and the flange 39 of the lower diaphragm. The perimeter 70 of the divider plate does not extend the entire length of the sealing flanges so that a seal can be easily achieved between the top diaphragm member and the bottom diaphragm member such as by adhesive or heat sealing means. However, the perimeter 70 is extended sufficiently far into the sealed area to create two distinct chambers between the top and bottom of the fluid package.

Figure 3:
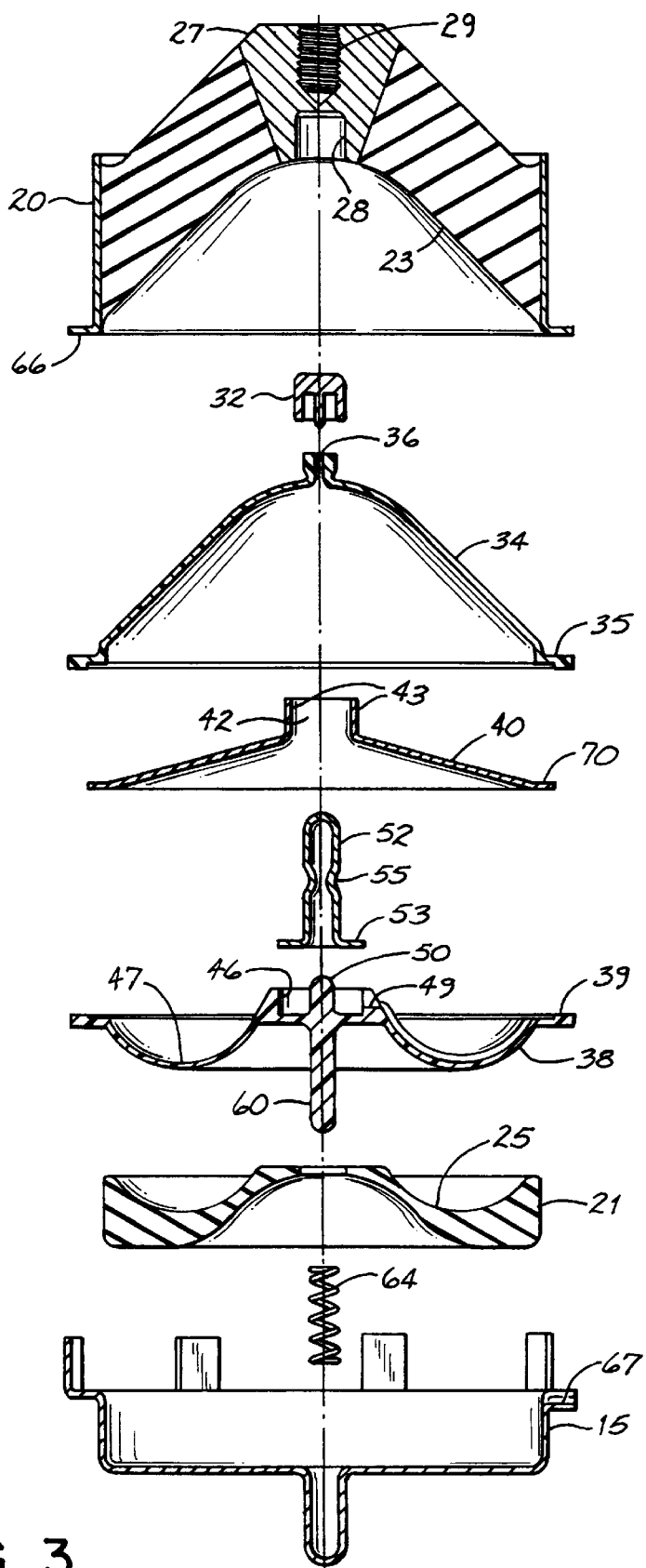
FIG. 3 is an exploded side cross-section of the first embodiment.
Figure 4:
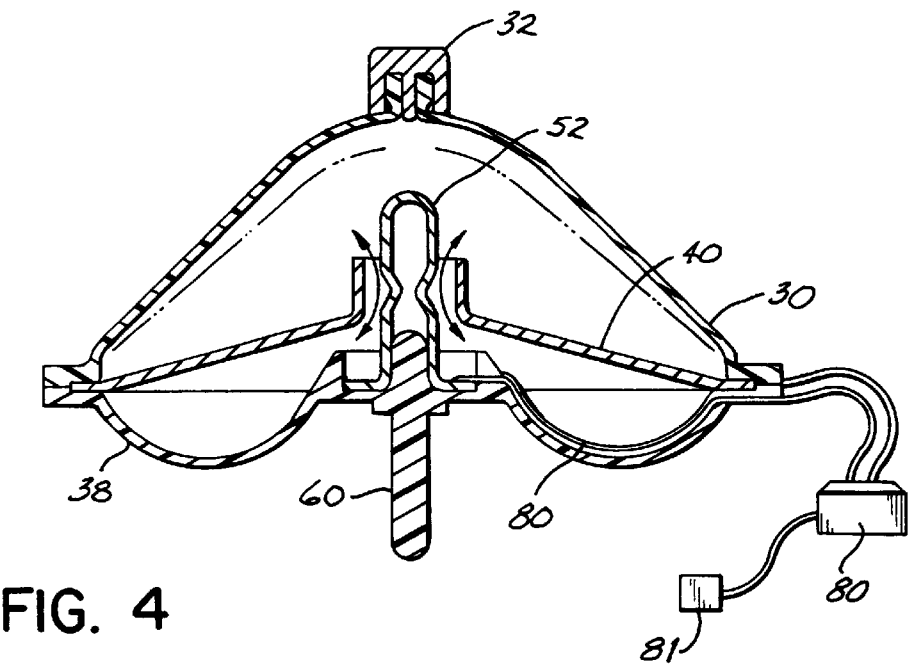
FIG. 4 is a side cross-section of a fluid composite member in accordance with the invention.

As can be seen in FIG. 3, the clip 17 may comprise laterally extending projections from the bottom supporting flange 67 of the bottom housing member which are merely bent into position to cooperate with the top supporting flange 66 of the upper housing. The present invention has the advantage that neither the top and bottom compliance members nor the top and bottom housing members must have an air tight or fluid tight seal. Likewise, the top and bottom compliance members may be designed solely for the purpose of damping vibration, and oscillation, without regard to achieving a seal between the members which is fluid tight regardless of the distribution of forces on the members. Likewise an advantage is provided insofar as the fluid package member may be assembled and filled in a different environment than the environment for the assembly of the mount. With the role of container being removed from the top and bottom compliance member, it is only necessary for them to support the fluid package 30, to provide resilient characteristics as are needed for the specific vehicle.

The present embodiment is designed for use with an electro-rheological fluid and therefore a sensor component 80 which is operatively connected to a microprocessor 81 includes a plate member 83 which forms a circuit with a lead connected to the divider plate 40.

The center pin electrode (stop cock 52) and a divider plate electrode are positioned to form a ring orifice within the central orifice 42, the ring orifice having an arc gap. The arc area is controlled by the diameters. When the lower compliance member and the lower diaphragm move downward, the center pin electrode will also move downward an equal or greater amount. This movement produces relative motion between the center pin electrode and the divider plate electrode which simulates a sliding plate mechanism in the electro-rheological fluid. The waist section 55 of the stop cock 52 is an additional tuning mechanism to regulate fluid flow.

The fluid chamber is designed so that as the top and bottom volumes are filled, the air will be forced to the fill port 36. An extension 46 in the lower diaphragm inhibits radial movement of the stop cock member to prevent direct contact with the electroplate 40.

Under normal conditions the upper compliance member acts as a standard elastomeric mount. However, when undesirable vibration characteristics are sensed by the microprocessor, a voltage is applied to the electrode which in turn increases the fluid viscosity and accordingly the damping properties of the mount.

Figure 5:
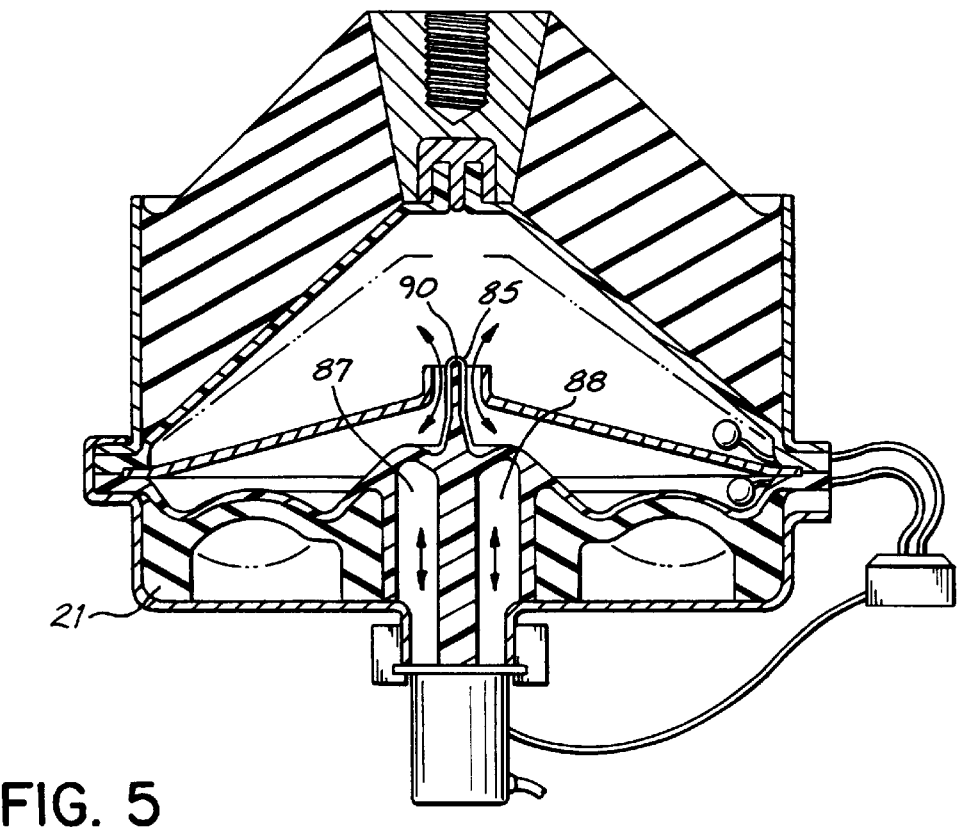
FIG. 5 is a side cross-section of a second embodiment of the elastomeric mount.

An alternative embodiment is shown in FIG. 5 in which electrical rheological fluid is not used. In this embodiment, a ring orifice is formed with a needle valve 85 operated by a servo hydraulic activator utilizing a micro processor similar to the one shown for the first embodiment. In this embodiment, hydraulic chambers 87, 88 can be driven upward or downward so as to change the relative location of the stop cock portion 90 of the needle valve 85. The hydraulic chambers 87, 88 are formed on the bottom side of the lower diaphragm and are further defined by a longitudinal opening in the bottom compliance member 21'.

In the present invention, the fluid container comprised of the upper diaphragm and lower diaphragm is preferably a heat or chemical sealable polymer having the required tensile, flex, elongation and fluid resistance properties. The specific examples including polyethylene and polypropylene. The upper and lower compliance members are an elastomer having the proper physical characteristics, and being premolded in halves for ease of assembly and to allow for greater internal detail. The mount may be assembled by first assembling the fluid package container with the internal divider plate in place as has been previously discussed, it is advantageous to provide a fluid type seal such as a heat seal at the sealing flanges of the upper and lower diaphragm. The fluid package container may subsequently be filled with fluid such as by a fill and evacuation technique through the fill port 36. Once filled, the fluid package may be tested for fluid or air leaks. Further, this may be accomplished in the present invention prior to implanting into the mount.

The fluid package may be assembled between the compliance members off site. The present design accommodates the assembly of the mount on site insofar as the assembler does not need to bother with the fluid, or with filling the mount. Further, the present design is seen as eliminating or at least reducing the two main causes of fluid malfunctions, leaks and air entrapment.

While in accordance with the patent statutes, the best mode and preferred embodiments have been set forth, the scope of the invention is not limited thereto, but rather by the scope of the attached claims.

What is claimed is:

1. A method of assembling a fluid damped elastomer mount having a upper compliance member and a lower compliance member cooperating so as to form an intermediate void, said void receiving a sealed fluid composite member, said method comprising;

assembling and filling a sealed fluid package; and then placing said fluid package in cooperative contact with one of said compliance members, and assembling said second compliance member so that said fluid package is within said void.

2. The method set forth in claim 1, wherein said fluid package is tested for fluid leaks prior to said assembly of said first and second compliance member.

3. The method as set forth in claim 1, wherein said fluid package member is tested for air entrapment prior to said assembly of said first and second compliance member.

4. The method of assembly as set forth in claim 1, if wherein said fluid package has a top diaphragm member, and a bottom diaphragm member, said top and bottom member being joined in a fluid tight heat or chemical seal.

5. A method of assembly as set forth claim 4, wherein said fluid package further includes an internal divider plate, said divider plate having a periphery which is captured at the seal between said top and said bottom diaphragm.

* * * * *